J. C. SMITH.
AUTOMATIC REGULATING VALVE.
APPLICATION FILED AUG. 10, 1908.
920,677.
Patented May 4, 1909.
2 SHEETS—SHEET 1.
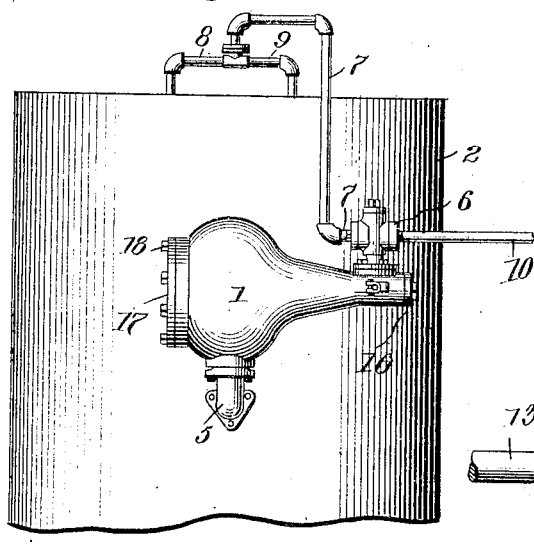
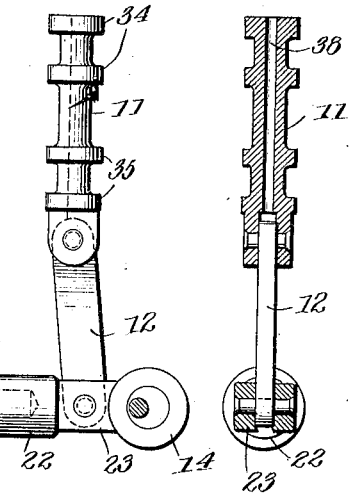
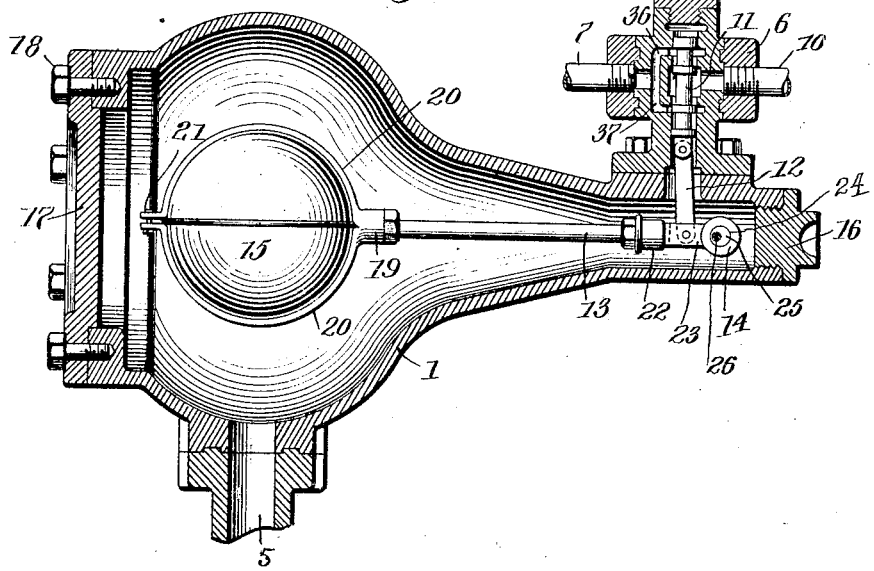
WITNESSES
INVENTOR
JOHN C. SMITH
BY
ATTORNEYS.

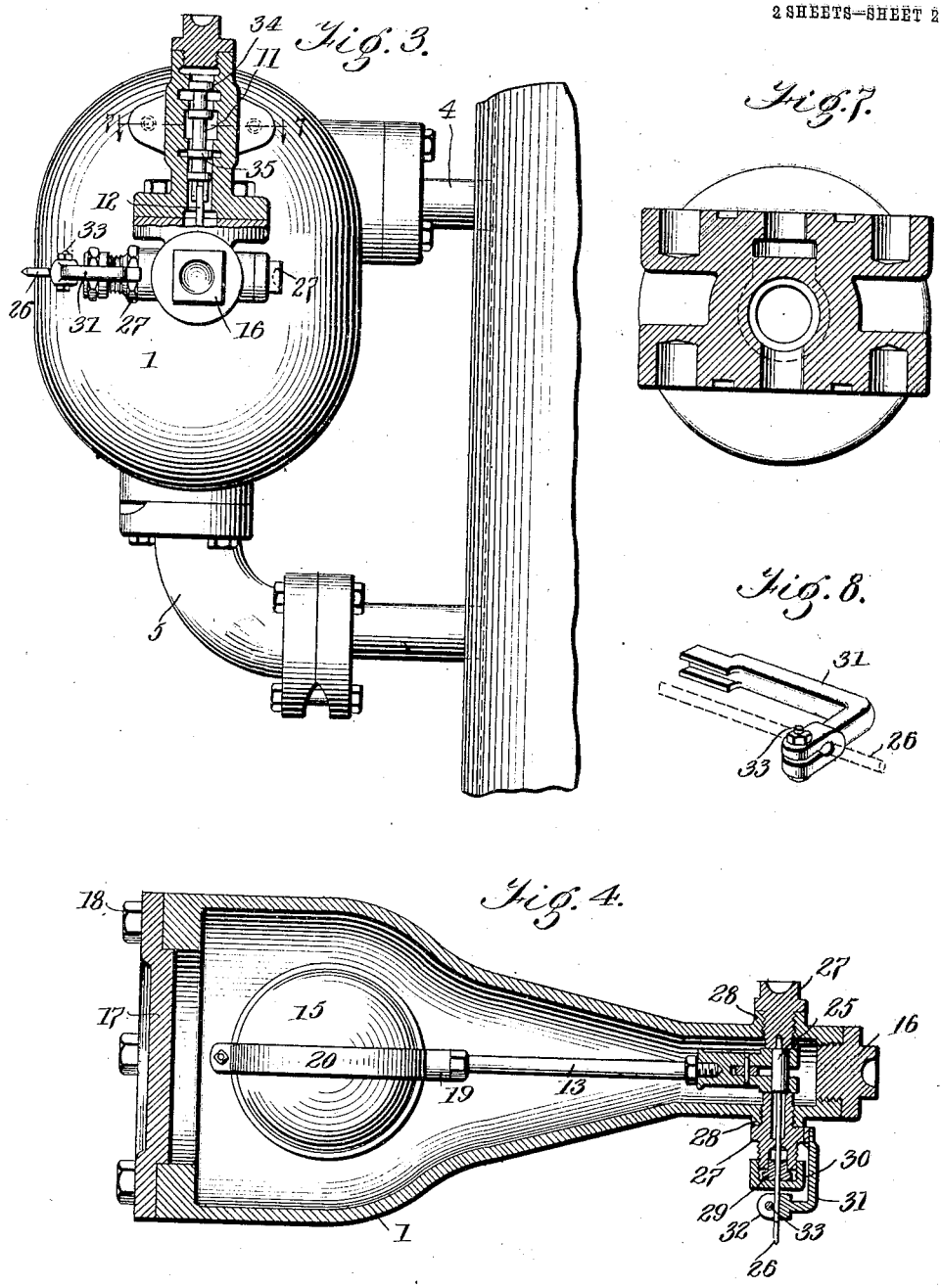

UNITED STATES PATENT OFFICE.

JOHN C. SMITH, OF LOUISVILLE, KENTUCKY.

AUTOMATIC REGULATING-VALVE.

No. 920,677.  Specification of Letters Patent.  Patented May 4, 1909.

Application filed August 10, 1908. Serial No. 447,765.

*To all whom it may concern:*

Be it known that I, JOHN C. SMITH, a citizen of the United States, and a resident of Louisville, in the county of Jefferson and State of Kentucky, have invented certain new and useful Improvements in Automatic Regulating-Valves, of which the following is a specification.

My invention is an improvement in automatic regulating valves and consists of certain novel constructions and combinations of parts hereinafter described and claimed.

Referring to the drawings forming a part hereof, Figure 1 is a partial side view of an absorber provided with the improved valve. Fig. 2 is a central longitudinal section of the valve. Fig. 3 is an end view of the valve partially in section. Fig. 4 is a horizontal section through the valve. Fig. 5 is a side view of the plunger and connections. Fig. 6 is a central longitudinal section. Fig. 7 is a horizontal section through the plunger casing and, Fig. 8 is a detail perspective view of the lock for the cam shaft.

In refrigerating machines of the type in which the valve is to be used, strong liquor or water saturated with ammonia gas is run into a still, the liquor is heated and the ammonia is driven off. The gas is then passed through the condenser where it is cooled and, being under high pressure, liquefies and is then expanded into a cooling coil, but the liquor ammonia may be run directly into the cooling coil and then evaporated. As the ammonia is being driven off from the liquor in the still, the weaker portion of the liquor sinks to the bottom where it is drawn off cooled and run into an absorber. Here it meets the anhydrous ammonia gas coming from the cooler or evaporator. The weak liquor having been cooled down absorbs this ammonia gas until it becomes saturated and in this condition is called strong liquor.

The subject of the present invention is intended for controlling the flow of the weak liquor to the absorber. The weak liquor leaves the generator under a pressure of approximately 150 pounds, while the gas admitted to the absorber is under a pressure of from 5 to 15 pounds. The returning fluid absorbs 27 to 29% of its weight of ammonia gas and for this absorption to take place, it is necessary that the pressure of the incoming fluid be equal to that of the incoming gas.

The valve is a float valve, and the casing for the float or the float chamber 1, is arranged on the side of the absorber 2, and communicates therewith by an upper pipe 4, and a lower pipe 5. The valve casing 6, communicates with the absorber by a pipe 7 which branches as at 8 and 9 before it opens therein, and with an inlet 10, from the refrigerating apparatus.

The plunger 11 is movable in the casing, and is connected by a link 12, with the lever 13 pivoted by one end as at 14 in the float chamber, in a manner to be presently described, and provided at its other end with a float 15 freely movable in the chamber.

The float chamber is of the shape shown in Figs. 1 and 2, one end the smaller being closed by a plug 16 threaded into the casing, and the other by a cover 17 secured to the casing by screws 18. The float lever 13 has threaded upon one end thereof a yoke 19 whose arms are curved in semi-circular form as at 20, and embrace the float 15, the free end of the arms being connected by a bolt 21, whereby the arms may be caused to tightly embrace the float, whereby to retain it in place. The opposite end of the lever 13 is threaded into a socket 22, on a link 23, which is provided with a bearing 24, journaled on the eccentric portion 25 of a shaft 26, which is journaled transversely of the float chamber in nuts 27, threaded into nipples 28 on the sides of the chamber. One of the nuts 27 is provided with a packing 29 in its free end, secured in place by a packing nut 30, and the free end of the shaft 26 is engaged by a clamp 31, connected with the adjacent nut 27, the free end of the clamp being split to provide jaws 32, for embracing the rod, the jaws being clamped thereon by a set screw 33.

It will be evident from the description that by loosening the jaws of the clamp, the shaft 26 may be rotated, whereby to vary the position of the plunger in the plunger casing for a purpose to be presently described.

The plunger 11 before mentioned, is provided near its upper end with a pair of annular ribs 34, and near its lower end with another pair of annular ribs 35, which ribs are of a diameter equal to that of the smallest internal diameter of the plunger casing. The inlet 10 from the refrigerating apparatus opens directly into the passage in which the plunger moves, while the outlet is connected with the passage by ports 36, 37, opening opposite the inlet and above and below the same as will be evident from an inspection of Fig. 2. The diameter of the passage in the plunger is enlarged by an annular groove with which the passages 36, 37 communicate, and a third enlargement is provided above the top of the plunger.

It will be evident from the description that when the plunger is in the position shown in Fig. 2, the inlet 10 may communicate with the outlet 7, until the fluid admitted into the absorber attains a height sufficient to elevate the float 15, when the plunger will be moved upwardly thus cutting off the supply of fluid. As soon as the renewed aqua-ammonia is removed from the absorber, the float will commence to drop thus again opening the valve.

From an inspection of Fig. 6, it will be observed that the plunger 11 is provided with a longitudinal opening 38 therethrough, which communicates with the annular enlargement above the top of the plunger, and with the float chamber, so that the pressure above and below the plunger will be equal. The amount of fluid passing through the valve may be regulated by raising and lowering the point of pivotal connection of the plunger with the float lever by means of the eccentric shaft upon which the said float lever is mounted. The ribs 34, and 35 on the plunger prevent the liquor from passing from the plunger casing into the float chamber. It will be observed that the weak liquor enters the valve above the liquid line in the absorber, whereby should there be a leak in the valve, the liquor will pass to the absorber through the float chamber.

I claim:

1. In a device of the class described, the combination with the absorber, of a float chamber communicating therewith, a valve casing adjacent to the float chamber, said chamber having an inlet, and an outlet communicating with the absorber at the top thereof, a plunger movable in the casing, a lever pivoted in the chamber by one end, and provided at the other with a float, a link connecting the plunger with the lever, said plunger having a longitudinal passage therethrough communicating with the float chamber, the plunger being provided near each end and with a pair of spaced annular ribs, the outlet branching on its entrance to the casing, and communicating therewith between the ribs of the plunger, when it is in its normal position.

2. In a device of the class described, the combination with the absorber, of a float chamber communicating therewith, means for controlling the inlet of liquid to the absorber, said means comprising a casing through which the liquid passes, a plunger movable in the casing, a float in the float chamber controlling said plunger, said plunger having a longitudinal passage therethrough communicating with the float chamber, and being provided near each end with a pair of spaced annular ribs, the casing being provided with an inlet for the liquid opening between the pairs of ribs, and with a branched outlet leading to the absorber and opening from the casing between the members of the individual pairs.

3. In a device of the class described, the combination with the absorber, of a float chamber communicating therewith, means for controlling the inlet of liquid to the absorber, comprising a casing, through which the liquid passes, a plunger movable in the casing, a float in the float chamber controlling the plunger, said plunger having a longitudinal passage therethrough communicating with the float chamber, the casing being provided with an inlet for the liquid, and with a branched outlet leading to the absorber, and opening above and below the inlet.

4. In a device of the class described, the combination with the absorber of a casing adjacent thereto, said casing being provided with an inlet, and with a branched outlet leading to the absorber, a longitudinally moving plunger in the casing, a float operated by the liquid in the absorber for controlling the plunger, said plunger having longitudinally opening therethrough communicating with the absorber.

5. The combination with the absorber, of a valve for controlling the passage of fluid thereto, means whereby the fluid in the absorber may operate the valve, a communication between the absorber and both sides of the valve, whereby to balance the same, and means for adjusting the extent of the movement of the valve, whereby to regulate the quantity of fluid passing thereby.

6. The combination with the absorber, of a valve for controlling the passage of fluid thereto, means whereby the fluid in the absorber may operate the valve, a communication between the absorber and both sides of the valve, whereby to balance the same, and means for adjusting the extent of the movement of the valve, whereby to regulate the quantity of fluid passing thereby, said means comprising a shaft provided with an eccentric portion, a bearing in connection with the valve and encircling the eccentric portion, and means for turning the shaft.

7. The combination with the absorber, of a valve for controlling the passage of fluid thereto, means whereby the fluid in the absorber may operate the valve, a communication between the absorber, and both sides of the valve, whereby to balance the same, and means for adjusting the extent of the movement of the valve, whereby to regulate the quantity of fluid passing thereby, said means comprising a shaft provided with an eccentric portion, a bearing in connection with the valve and encircling the eccentric portion, means for turning the shaft, and means for locking the shaft in adjusted position.

8. In a device of the class described, a valve casing a plunger valve movable therein, a stem connected with the valve, a lever having at one end a bearing and at the other a float for the purpose set forth, said lever being pivotally connected with the stem, a shaft having an eccentric portion on which the bearing is journaled, a split clamp embracing the shaft, and means for locking the clamp on the shaft.

9. In a device of the class described, a valve casing, a plunger valve movable therein, a stem connected with the valve, a lever having at one end a bearing and at the other a float for the purpose set forth, said lever being pivotally connected with the stem, a shaft having an eccentric portion on which the bearing is journaled, and means for locking the shaft in adjusted position.

10. In a device of the class described, the combination with the absorber, of a casing adjacent thereto, said casing being provided with an inlet, and with an outlet leading to the absorber, a longitudinally movable plunger in the casing for controlling the communication between the inlet and the outlet, a float operated by the liquid in the absorber, for controlling the plunger, and means outside of the casing for regulating the extent of movement of the plunger.

11. In a device of the class described, the combination with the absorber, of a casing adjacent thereto, said casing being provided with an inlet, and with an outlet leading to the absorber, a plunger in the casing for controlling the communication between the inlet and the outlet, a float operated by the liquid in the absorber for controlling the plunger, and means outside of the casing for regulating the extent of movement of the plunger, said means comprising a shaft having an eccentric portion, a bearing in connection with the plunger, journaled on the eccentric portion, and means for turning the shaft.

12. In a device of the class described, the combination with the absorber, of a casing adjacent thereto, said casing being provided with an inlet, and with an outlet leading to the absorber, a plunger in the casing for controlling the communication between the inlet and the outlet, a float operated by the liquid in the absorber for controlling the plunger, and means outside of the casing for regulating the extent of movement of the plunger, said means comprising a shaft having an eccentric portion, a bearing in connection with the plunger journaled on the eccentric portion, and means for locking the shaft in adjusted position.

JOHN C. SMITH.

Witnesses:
J. W. JORDAN,
J. C. SWARTZ.